United States Patent
Tschopp et al.

[11] Patent Number: 5,923,000
[45] Date of Patent: Jul. 13, 1999

[54] SHOCK PROTECTION DEVICE FOR A FORCE MEASURING APPARATUS

[75] Inventors: Ernst Tschopp, Laupen; Hans-Rudolf Burkhard, Wila; Ferdinand Schneider, Winterthur, all of Switzerland

[73] Assignee: Mettler-Toledo GmbH, Greifensee, Switzerland

[21] Appl. No.: 08/861,869

[22] Filed: May 22, 1997

[30] Foreign Application Priority Data

Jul. 19, 1996 [CH] Switzerland .............................. 1814/96
Feb. 21, 1997 [CH] Switzerland .............................. 0413/97

[51] Int. Cl.⁶ .......................... G01G 23/02; G01G 3/14; G01G 3/08
[52] U.S. Cl. .......................... 177/154; 177/156; 177/229; 177/210 EM
[58] Field of Search ...................................... 177/154, 155, 177/156, 184, 229, 210 EM, 212; 73/862.624, 862.639, 862.621, 862.627, 862.632

[56] References Cited

U.S. PATENT DOCUMENTS

| 3,135,112 | 6/1964 | Farley | 73/862.634 |
| 3,354,710 | 11/1967 | Johnson | 177/229 |
| 4,338,825 | 7/1982 | Amlani et al. | 73/862.632 |
| 4,419,902 | 12/1983 | Somal | 73/862.632 |
| 4,467,661 | 8/1984 | Somal | 73/862.632 |

*Primary Examiner*—Randy W. Gibson
*Attorney, Agent, or Firm*—Friedrich Kueffner

[57] ABSTRACT

A shock protection device for a force measuring apparatus, particularly a balance, which includes a material block with a stationary parallelogram side member, a deflectable parallelogram side member serving for receiving the force to be measured, two guide members which are bending-elastic in the plane of the parallelogram and which connect the two parallelogram side members, and at least one lever which is connected through a coupling member to the deflectable parallelogram side member. The shock protection device includes a safety bolt inserted into a bore extending at least partially through the force measuring apparatus, wherein the safety bolt is connected without play to one of the components forming the force measuring apparatus, while the safety bolt has radial play relative to the remaining components through which the bolt extends.

18 Claims, 4 Drawing Sheets

SHOCK PROTECTION DEVICE FOR A FORCE MEASURING APPARATUS

BACKGROUND OF THE INVENTION

1. Field of the Invention

The present invention relates to a shock protection device for a force measuring apparatus, particularly a balance, wherein the force measuring apparatus includes a material block with a stationary parallelogram side member, a deflectable parallelogram side member serving for receiving the force to be measured, two guide members which are bending-elastic in the plane of the parallelogram and which connect the two parallelogram side members, and at least one lever which is connected through a coupling member to the deflectable parallelogram side member.

2. Description of the Related Art

Overload protection devices for balances are known in the art. These devices usually have the purpose of preventing damage to the measuring cell when an excessive load is placed on the weighing dish or when the load drops perpendicularly onto the weighing dish as a result of careless handling. Most known overload protection devices are constructed as stops which limit the vertical travel path of the load receiving means, so that no forces exceeding the computed forces can be introduced into the measuring cell. These devices are of a generally very simple construction and meet their object in an excellent manner.

However, balances cannot only be damaged during weighing, but also during the transport from the manufacturer to the purchaser and possibly also during transport and cleaning on the premises of the user. In that case, forces damaging the balance do not act exclusively in vertical direction onto the force measuring apparatus, but in all possible directions inclined relative to the vertical direction. In order to prevent high acceleration values to act on the force measuring apparatus during shipment, balances are packed in shock-absorbing materials in a complicated and, thus, expensive manner. Such packing materials are very voluminous and, therefore, require a large and also expensive transportation volume, particularly in the case of world wide shipment. Nevertheless, they only provide limited protection.

It is also possible to secure sensitive parts of the balance prior to shipment by means of screws. However, this means that an additional operation is required at the manufacturer and that the balance can only be operated by the purchaser and user when the screws of the transport securing means have been loosened or removed. However, this means that an intervention has to be carried out in the balance which has been calibrated by the manufacturer and that, furthermore, additional time is required for putting the balance in operation.

In modern force measuring apparatus, as described, for example, in DE-A1-4305426, the parallelogram side members, the guide members and the coupling member are frequently constructed of a single-piece material block. The bending points which connect the individual elements to each other have a thickness which is only a few hundreds of a millimeter to a few tenth of a millimeter. Consequently, it is extremely important that these precise elements are protected against the influence of shock.

SUMMARY OF THE INVENTION

Therefore, it is the primary object of the present invention to provide a shock protection device for a force measuring apparatus which protects the bending flexures within the material block against the influences of impacts, not only during the transport of the balance, but permanently also during use and handling of the balance.

In accordance with the present invention, in a shock protection device for a force measuring apparatus, particularly a balance, including a material block having a stationary parallelogram side member, a deflectable parallelogram side member serving for receiving the force to be measured, two guide members which are bending-elastic in the parallelogram plane and connected to the parallelogram side members, and at least one lever which is connected through a coupling member to the deflectable parallelogram side member, the above-described object is met by a safety bolt inserted into a bore extending at least partially through the force measuring apparatus, wherein the safety bolt is connected without play to one of the components forming the force measuring apparatus, while having radial play relative to the remaining components through which the bolt extends.

The shock protection device according to the present invention is mounted permanently and protects the force measuring apparatus not only during the transport and use thereof, but the shock protection device can be mounted already by the manufacturer before the balance undergoes the quality and final controls and the calibration. The shock protection device can remain inserted at all times; the balance does not have to be prepared for transport and it is not necessary later to carry out appropriate measures for putting the force measuring apparatus in operation. Consequently, any intervention into the mechanics of the balance by untrained persons is also not necessary.

The bore in the material block which receives the safety bolt can be manufactured inexpensively and extremely precisely already prior to processing of the material block, i.e., prior to eroding the guide members, the lever and the coupling member. This ensures that the sections which are spaced apart from each other by free spaces after processing of the material block are in perfect alignment and the predetermined clearance between the safety bolt and the walls of the bore sections are defined precisely and can be adhered to with accurate dimensions.

The shock protection device can be used in force measuring apparatus having one or more levers. It is possible to use a single safety bolt which extends through several levers, or it possible to use several safety bolts which each extend through individual levers and/or guide members and protect the appropriate bending points.

For axially securing the position of the safety bolt, it is also possible to provide a transverse bolt. The bores necessary for mounting the safety bolt and the transverse bolt can be manufactured very easily because the diameters of the bolts are constant over the entire lengths of the bores. In the simplest embodiment of the invention, the two bores can extend completely through the material block. The requirements with respect to accuracy of the spacing between the axes of the two bores are also not very high. The transverse bolt can be pressed or glued into the transverse bore. The safety bolt is inserted manually into the bore provided for this purpose and is then turned by 45° to 90° by means of a torque wrench. Other safety measures or subsequent adjustment measurements are not required. The manufacture of the two bolts is also very simple. The transverse bolt is cylindrical over the entire length thereof; the safety bolt is a turned part, wherein an end portion thereof is partially milled to provide a flattened surface.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
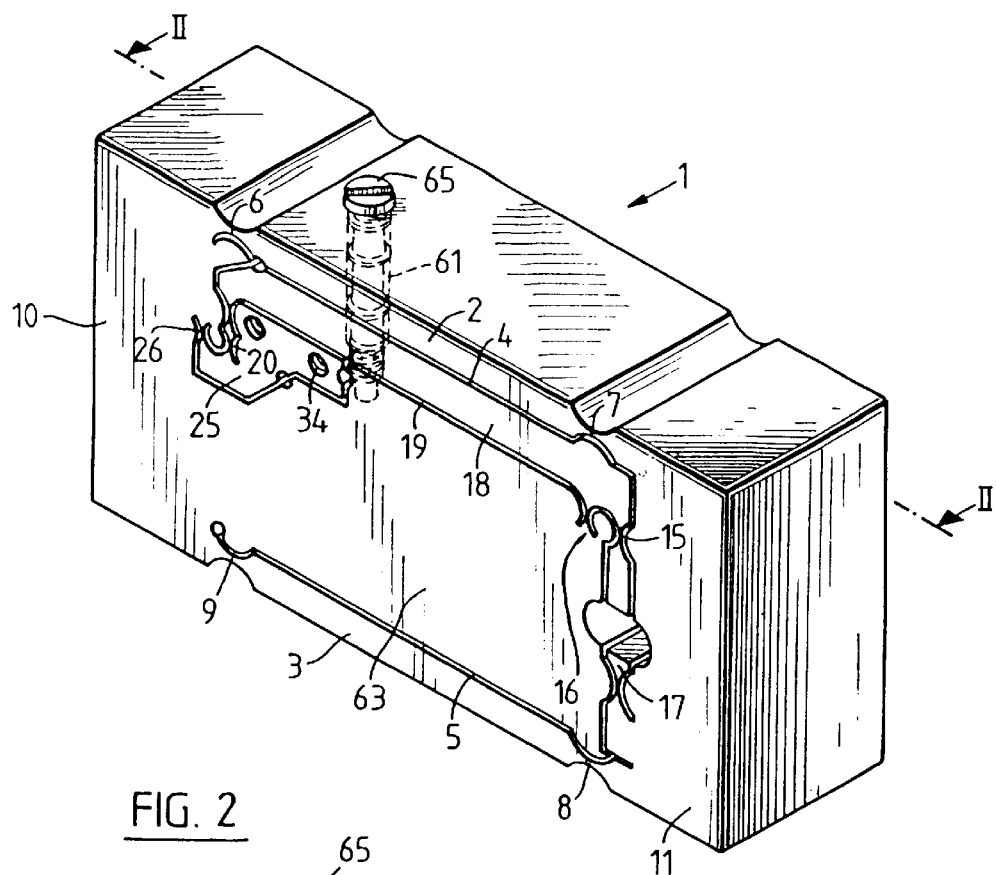
FIG. 1 is a perspective view of a single-piece material block of a force measuring apparatus, shown without measuring transducer.

FIG. 1 of the drawing shows of a balance only a single-piece material block 1 in which a parallel guide means is formed by material-free areas. The material-free areas are produced by spark erosion (electric discharge machining) and form the demarcation lines between the elements of the parallelogram guide means.

Reference numerals 2 and 3 denote an upper guide member and a lower guide member, respectively, which extend parallel to the upper surface and the lower surface of the parallelepiped-shaped material block 1. The two guide members 2 and 3 are connected to the parallelogram side members 10 and 11 through bending points 6, 7, 8 and 9. The parallelogram side member 10 is stationary, while the parallelogram side member 11 is guided by the guide members 2, 3 so as to be capable of parallel deflection. The material-free areas 4 and 5, which separate the guide members 2 and 3 from the remaining material of the material block 1, extend in the areas of the bending points 6, 7, 8 and 9 up to close to the surface of the material block 1 which at these locations is provided with arc-shaped grooves formed in the two surfaces. The material thickness in the areas of the bending points 6–9 is in the range of a few tenth of a millimeter.

The material-free area 4, and another material-free area 19 which extends essentially parallel to the material-free area 4, form a first lever 18 within the material block 1. This lever 18 is connected on the right hand side through a coupling member 17 to the deflectable parallelogram guide member 11. On the other side, the lever 18 is connected to a second lever 25 through a bending point 20. The second lever 25 is connected through a bending point 26 to the stationary parallelogram side member 10. The geometric configuration of the two levers 18 and 25 and the arrangement of the bending points connecting the levers and guide members or parallelogram side members are determined by the requirements to be made of the measuring cell. Alternatively, the material block can also be constructed with more or fewer than two levers.

Two bores 34 for fastening support members, not shown, are provided in the second lever 25, wherein parts of an electromagnetic measuring transducer can be fastened to the ends of the support members.

A bore 61 is provided in that area of the material block 1 in which the two guide members 2 and 3 and the two levers 18 and 25 are located above each other, wherein the bore 61 extends from the upper surface of the material block 1 perpendicularly through the material block 1 into the stationary parallelogram side member 10, i.e., into the portion 63 of the parallelogram side member 10 projecting between the two guide members 2 and 3. The bore 61 receives a safety bolt 65 whose configuration and operation will be explained below with the aid of FIG. 2 and of FIGS. 6 to 9.

Figure 2:
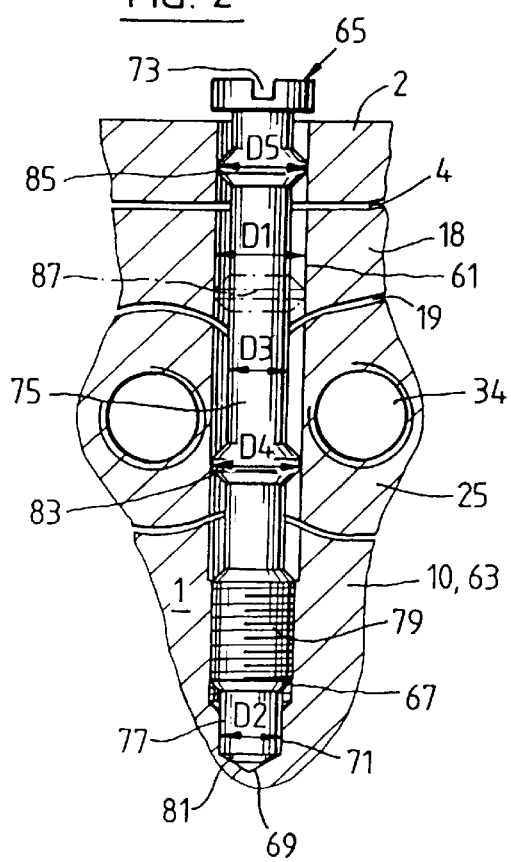
FIG. 2 is a partial longitudinal sectional view of the material block in the area of the safety bolt taken along sectional line II—II of FIG. 1.

As shown in FIG. 2, the bore 61 has a diameter $D_1$ in the upper guide member 2, in the first lever 18, in the second lever 25 and in at least a portion of the part 63 of the parallelogram side member 10. It is also possible to provide stepped bores with different diameters in the individual elements of the material block. A threaded portion 67 is provided adjacent the end portion of the bore 61 and a cylindrical bore 71 having a smaller diameter $D_2$ is located adjacent the bottom of the threaded portion 67. The two coaxial bores 61 and 71 have narrow dimensional tolerances. Alternatively, the bore 71 may end in a conical portion 69 which serves for centering the safety bolt 65. In that case, the bore 71 does not have to have a narrow tolerance.

A screw head 73 is provided at the top of the safety bolt 65. The shaft 75 of the safety bolt 65 has a diameter $D_3$ which is substantially smaller than the diameter $D_1$ of the bore 61. The lower end 77 of the safety bolt 65 which is located in the narrower bore portion 71 does not have a thread and has a diameter which is only slightly smaller than that of the bore 71. A thread 79 corresponding to the threaded bore 67 is provided in the shaft 75 above the portion 71. The lower end 81 of the shaft 75 is beveled or rounded.

A first circumferential shoulder 83 is provided on the shaft 75 in the area where the shaft 75 extends through the second lever 25. The shoulder 83 has an outer diameter $D_4$ which is smaller than the diameter $D_1$ of the bore 61. The play of the first shoulder 83 in the bore 61 is very small and is in the order of magnitude of, for example, 0.1 mm.

A second circumferential shoulder 85 is provided on the shaft 75 in the area where the shaft 75 extends through the upper guide member 2. The diameter $D_5$ of the shoulder 85 is also smaller than the diameter $D_1$ of the bore 61, however, the clearance is greater than in the case of the shoulder 83 in the area of the second lever 25.

In addition to the two shoulders 83 and 85, a third shoulder 87, shown in dash-dot lines, can be arranged with play relative to the bore 61 in the area where the bore 61 extends through the first lever 18, if this first lever 18 is also to be protected.

The two parallelogram side members 10 and 11 and the two guide members 2 and 3 may also be manufactured as separate components into which the levers 18 and 25 and the connections thereof are inserted.

In the further embodiment illustrated in FIGS. 5–11, a bore 161 is provided in the portion of the material block 101 in which the two guide members 102 and 103 and the two levers 118 and 125 are located one above the other, respectively. The bore 161 extends from the upper surface of the material block 101 perpendicularly through the material block 101 into the stationary parallelogram side member 110, i.e., into the portion 163 of the parallelogram side member 110 projecting between the two guide members 102 and 103. The bore 161 receives a safety bolt 165 whose configuration and operation will be explained in detail below with the aid of FIGS. 6–11.

The bore 161 has a diameter $D_1$ in the upper guide member 102, in the first lever 118, in the second lever 125 and in at least a portion of the part 163 of the parallelogram side member 110. The bore 161 may extend through the entire material block 101 and may have the constant diameter $D_1$. The bore 161 composed of coaxially aligned sections is manufactured with narrow dimensional tolerances. A transverse bore 162 extending perpendicularly of the bore 161 is provided in the parallelogram side member 110, wherein the transverse bore 162 may extend through the parallelogram side member 110. The transverse bore 162 serves to receive a cylindrical transverse pin 164, wherein a head 166 may be provided at one end of the pin 164. The diameter of the transverse pin 164 is either selected in such a way that the transverse pin 164 is tightly seated in the transverse bore 162 after having been inserted into the transverse bore 162, or the transverse pin 164 is glued into the transverse bore 162.

The transverse bore 162 extends through the bore 161, wherein the overlap X is in the order of magnitude of 20 to 30% of $D_1$.

The cylindrical shaft of the safety bolt 165 has four portions adjacent the head 173. Analogously to the first embodiment, the first cylindrical portion 170 has at least one circumferential shoulder 183. The second portion 172 is also cylindrical, however, with a greater diameter $D_5$; the third portion 174 has a circular or elliptical cross-section, wherein the center or axis B is offset relative to the axis A of the safety bolt 165. The fourth portion 176 forming the end of the bolt 165 is also cylindrical, however, a flattened surface 178 extending parallel to the axis A is provided on at least one location of the portion 176. The cylinder portion removed by forming the flattened surface 178 has a height h which corresponds at least to the amount of the overlap X. The third portion 174 is located in the area of the overlap X.

The flattened surface 178 extends also over the third portion 174 if the elliptical cross-section or the circular cross-section, whose axis B is located offset relative to the axis A, were to project radially above the flattened surface in the fourth portion 176.

The first circumferential shoulder 183, whose outer diameter $D_4$ is smaller than the diameter $D_1$ of the bore 161 and which is formed on the shaft 175 of the bolt 165, is located in the area where the shaft 175 extends through the second lever 125. The clearance of the first shoulder 183 in the bore 161 is very small and is in the order of magnitude of, for example, 0.1 mm.

In addition to the shoulder 183, a second shoulder 187 can be arranged with play relative to the bore 161 in the area where the bore 161 extends through the first lever 118, if this first lever 118 is also to be protected.

When a non-vertical force and/or an acceleration which exceeds a normal load, i.e., a shock-type load, act on the force measuring apparatus, either as a result of a load being placed too quickly on the weighing dish or an excessive eccentrically placed load, or a load dropping onto the weighing dish or impact occurring during transport from any direction, individual or several components of the force measuring apparatus, i.e., the components of the material block, yield laterally as a result of mass inertia. This yielding is limited by the safety bolt 65, 165 in all those directions in which damage or destruction of components of the material block 1 is possible, particularly the very fine and sensitive bending flexures 15, 16 which connect the coupling member 17 to the guide members 2 and 3 and the deflectable parallelogram side member 11. Also protected are the bending points 20 and 26 which connect the second lever 25 to the stationary parallelogram side member 10 and the first lever 18. After a very short travel distance in the order of magnitude of hundredths of millimeters, the components subjected to the force influence come into contact with the corresponding shoulder of the bolt 65. The safety bolt 65 in the first embodiment, which is connected rigidly to the material block 1 only at its end, is itself radially supported by the uppermost shoulder 85 within the material block 1. The play of the shoulder 85 within the bore 61 is dimensioned so small that only a minimum bending by the amount of the play occurs. The lateral displacement of the safety bolt 65 relative to the material block 1 is dimensioned in such a way that damage of the deflected components of the measuring cell is made impossible. On the other hand, the play between the shoulders on the shaft 75 of the safety bolt 65 is large enough to ensure that the movements of the individual components, i.e., upper guide member 2, first and second levers 18 and 25, are not influenced during a weighing procedure. Accordingly, it is not necessary to disassemble the safety bolt 65 for starting operation and continued use of the balance.

In the embodiment in which the safety bolt 165 has four portions 170–176, the safety bolt 165 is held in the part 163 in the areas of the second through fourth portions 172–176. The connection between the part 163 and the safety bolt 165 will be described in more detail below.

Figure 6:
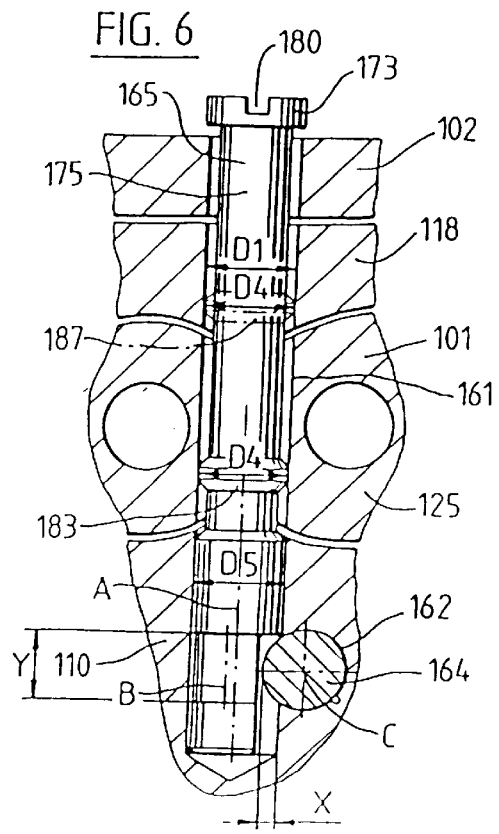
FIG. 6 is a longitudinal sectional view of the material block of FIG. 5 in the area of the safety bolt, taken along sectional line VI—VI in FIG. 5, with the safety bolt being loosened.
Figure 7:
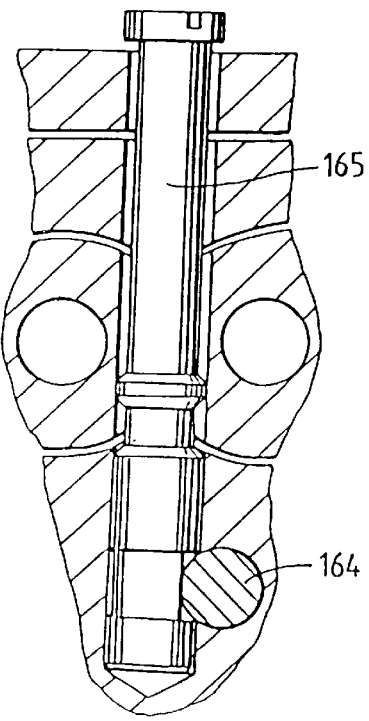
FIG. 7 is a longitudinal sectional view of the material block of FIG. 5 in the area of the safety bolt, taken along sectional line VI—VI in FIG. 5, with the safety bolt being tightened.
Figure 8:
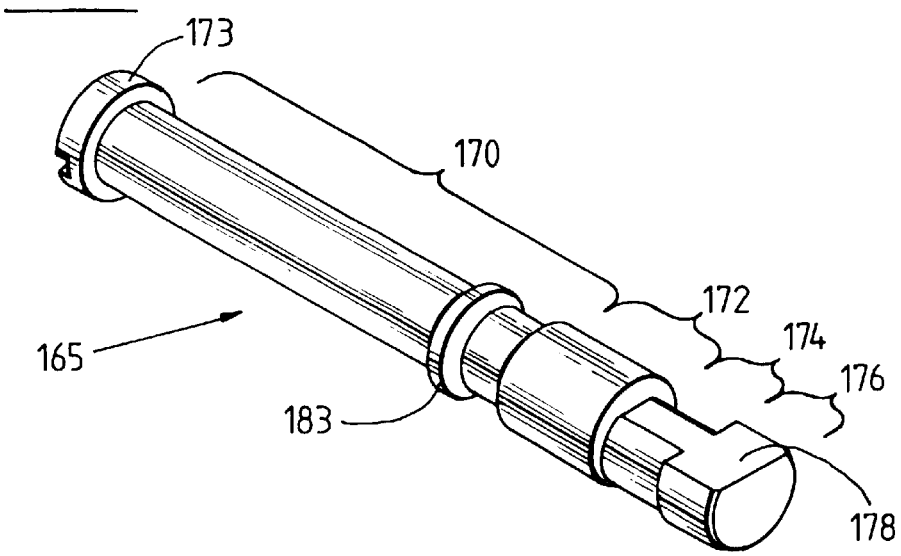
FIG. 8 is a perspective view of the safety bolt.
Figure 9:
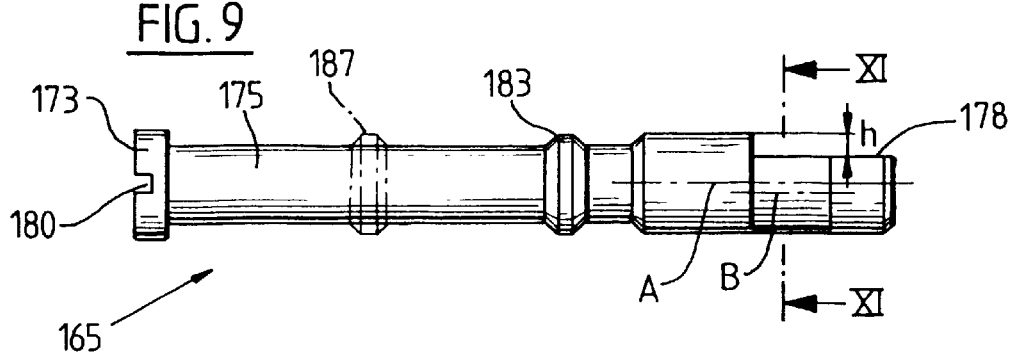
FIG. 9 is a side view of the safety bolt of FIG. 8.
Figure 10:
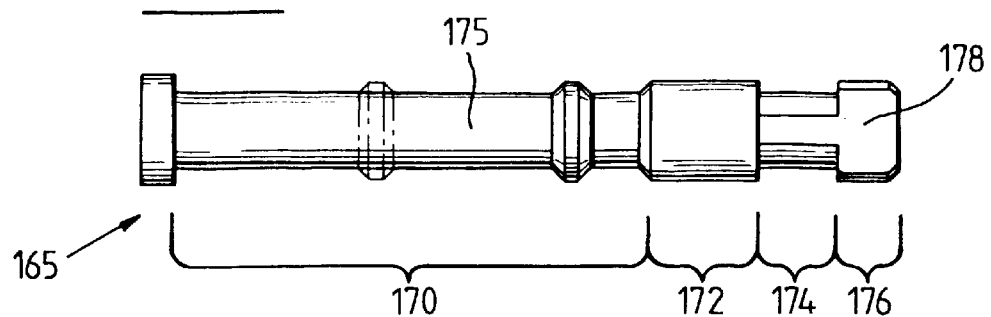
FIG. 10 is a top view of the safety bolt of FIG. 8.
Figure 11:
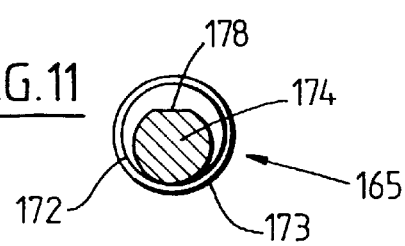
FIG. 11 is a transverse sectional view of the bolt taken along sectional line XI—XI of FIG. 9.

The transverse bolt 164 is pressed or glued into the transverse bore 162 of the material block 101. As shown in FIG. 6, the circumferential surface of the transverse bolt 164 then protrudes into the cross-section of the bore 161 for the safety bolt 165. The safety bolt 165 is now inserted in the bore 161. When the safety bolt 165 is inserted, it must be ensured that the flattened surface 178 of the portions 174 and 176 extends parallel to the axis C of the transverse bolt 164. In this manner, the safety bolt 165 can be guided past the transverse bolt 164. The fourth portion 176 is then located below the area Y. Depending on the accuracy of fit, the completely inserted bolt 165 is now secured in the area 163 already with very exact guidance and support. In order to secure this position so as to be immovable, the safety bolt 165 is turned by 45°–90° by means of a tool, for example, a screwdriver, which engages in a slot 180 in the screw head 173. This rotation causes the circumferential surface of the third eccentric portion 174 to come into contact with the transverse bolt 164. The resulting force directed perpendicularly of the axis A presses the safety bolt 165 with the circumferential surfaces of the second and fourth portions 172 and 176 against the wall of the bore 161. The safety bolt 165 is now aligned very precisely relative to the longitudinal axis A of the bore 161 and is secured in this position.

In an alternative embodiment, not shown in the drawing, the portions 174 and 176 could have the same diameter as the portion 172 and may be cylindrical, if the transverse pin 164 is provided with an eccentric portion.

FIGS. 1 and 2 show embodiments of the force measuring apparatus with two levers. Analogously, a force measuring apparatus with three or four levers can be protected against damage in the same manner by arranging a support shoulder on the safety bolt 65, 165 in each of the bore sections extending through the individual levers.

Figure 3:
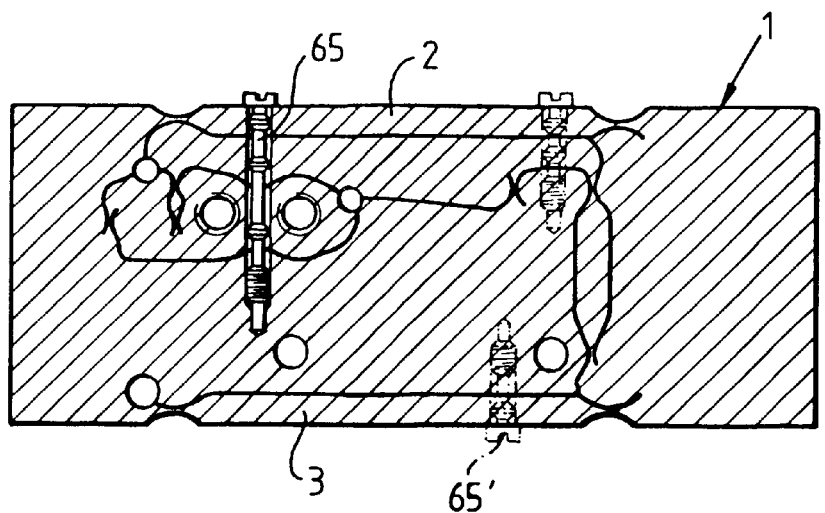
FIG. 3 is a schematic longitudinal sectional view of the material block taken along sectional line II—II in FIG. 1.

Depending on the configuration and construction of the material block 1, 101, it may be necessary or advantageous to use two or more safety bolts instead of a single safety bolt. This is schematically illustrated in FIG. 3 in which, however, the material block 1 also has only two levers. The first safety bolt 65 is mounted as already described and illustrated in FIGS. 1, 2 and 5. The second safety bolt 65' is inserted from the bottom side of the material block 1 and, consequently, also protects the lower guide member 3 which, in the embodiments including a safety bolt, is not included in the shock protection device. When additional levers are provided, this second safety bolt 65' extends through these additional levers and securely supports the levers under the influence of a shock. The second safety bolt 65' can be anchored in the guide member 3 or in the stationary parallelogram side member 10 and may engage with play in the respectively other component.

As also shown in FIG. 3, a further safety bolt 65 can be mounted analogously in the upper guide member 2.

Figure 4:
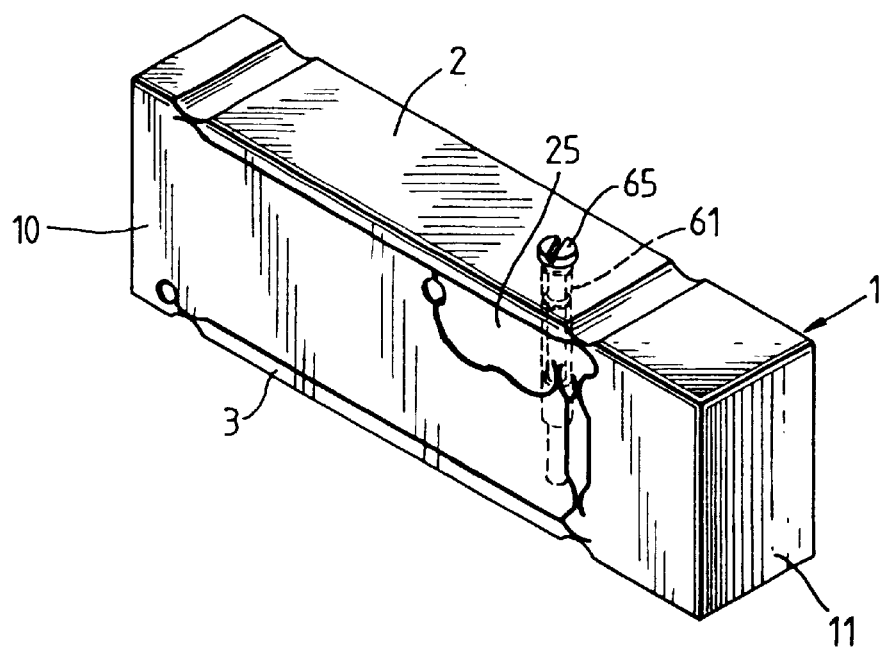
FIG. 4 is a perspective view of a material block having only one lever.
Figure 5:
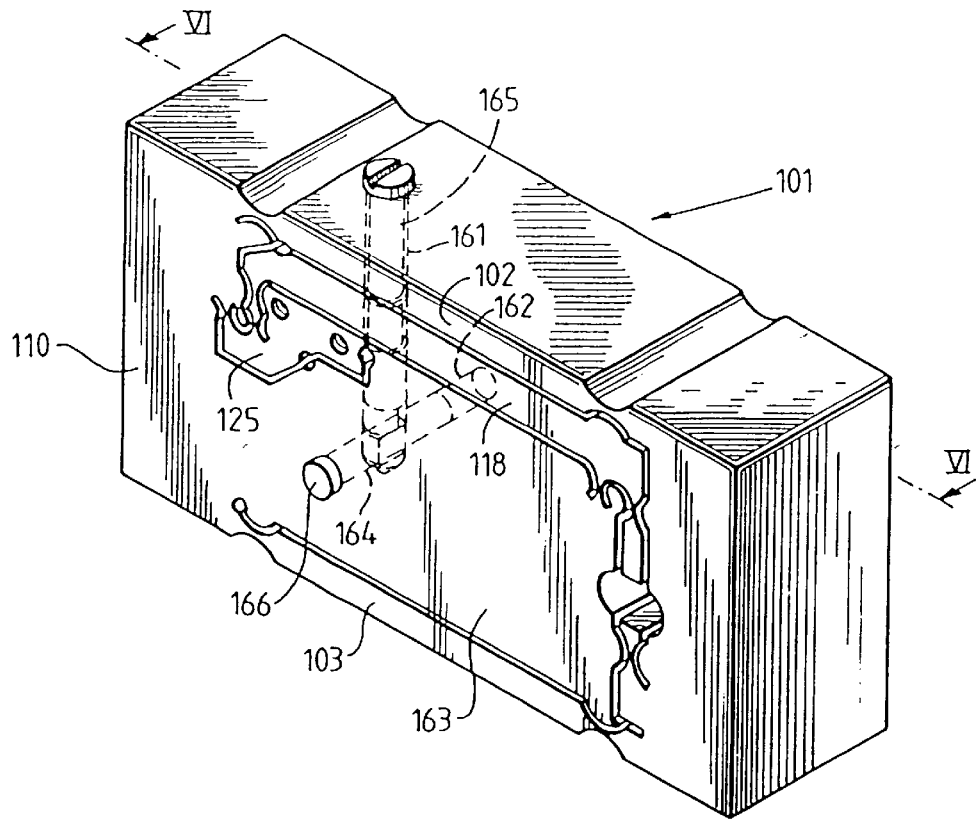
FIG. 5 is a perspective view of a single-piece material block of another embodiment of a force measuring apparatus.

In the case of a single-lever force measuring apparatus as illustrated in FIG. 4, the safety bolt 65 extends through the single lever 25 and the upper guide member 2 and/or the lower guide member 3.

The safety bolt 165 can be inserted into material blocks in the same manner as described above in connection with FIGS. 1–4.

Depending on the configuration of the measuring cell, several bolts 65 or 165 may be required for protecting all components. It is also possible to use a bolt which extends over the entire height of the measuring cell and serves also to protect the lower guide member.

While specific embodiments of the invention have been shown and described in detail to illustrate the inventive principles, it will be understood that the invention may be embodied otherwise without departing from such principles.

We claim:

1. A shock protection device for a force measuring apparatus, the force measuring apparatus comprising a material block having as force measuring apparatus components a stationary parallelogram side member, a deflectable parallelogram side member for receiving a force to be measured, two guide members connecting the two parallelogram side members, the guide members being bending-elastic in a parallelogram plane, and at least one lever connected through a coupling member to the deflectable parallelogram side member, the material block having at least one bore extending at least partially through the force measuring apparatus, the shock protection device comprising a safety bolt inserted into the at least one bore, the safety bolt being connected without play to one of the components forming the force measuring apparatus through which the safety bolt extends, while having a radial play relative to remaining components through which the safety bolt extends, wherein the at least one bore extends at least through one of the guide members, the at least one lever and the stationary parallelogram side member, wherein the safety bolt is connected to the stationary parallelogram side member, while having a radial play relative to the at least one guide member and the at least one lever.

2. The shock protection device according to claim 1, wherein the at least one bore extends at least through one of the guide members, the at least one lever and the stationary parallelogram side member, wherein the safety bolt is connected to the stationary parallelogram side member, while having a radial play relative to the at least one guide member and the at least one lever.

3. The shock protection device according to claim 2, wherein the at least one safety bolt comprises a shaft, a circumferential shoulder each being formed on the shaft at locations where the safety bolt extends through the at least one lever and the at least one guide member, the bore having a diameter, wherein each shoulder has an outer diameter which is smaller than the diameter of the bore, the shaft further comprising means for connecting the safety bolt without play to the stationary parallelogram side member.

4. The shock protection device according to claim 3, wherein the means for connecting the safety bolt without play to the stationary parallelogram side member comprises a threaded portion on the shaft, wherein the threaded portion engages a threaded bore portion of the at least one bore, further comprising centering means for coaxially centering the shaft of the safety bolt relative to the bore.

5. The shock protection device according to claim 2, wherein the at least one bore comprises a first bore portion and a second bore portion extending coaxially with the first bore portion, the first bore portion and the second bore portion each having a diameter, wherein the diameter of the second bore portion is smaller than the diameter of the first bore portion, the second bore portion ending in a conical bottom surface, wherein the shaft has a bottom end having a bevelled tip.

6. The shock protection device according to claim 2, wherein the at least one bore comprises a first bore portion and a second bore portion extending coaxially with the first bore portion, the first bore portion and the second bore portion each having a diameter, wherein the diameter of the second bore portion is smaller than the diameter of the first bore portion, the second bore portion ending in a conical bottom surface, wherein the safety bolt has a bottom end having a rounded tip.

7. A shock protection device for a force measuring apparatus, the force measuring apparatus comprising a material block having as force measuring apparatus components a stationary parallelogram side member, a deflectable parallelogram side member for receiving a force to be measured, two guide members connecting the two parallelogram side members, the guide members being bending-elastic in a parallelogram plane, and at least one lever connected through a coupling member to the deflectable parallelogram side member, the material block having at least one bore extending at least partially through the force measuring apparatus, the shock protection device comprising a safety bolt inserted into the at least one bore, the safety bolt being connected without play to one of the components forming the force measuring apparatus through which the safety bolt extends, while having a radial play relative to remaining components through which the safety bolt extends, wherein the material block has a transverse bore extending transversely of the at least one bore, wherein the at least one bore is partially intersected by the transverse bore, further comprising a transverse pin having a circumferential surface, wherein the circumferential surface of the transverse pin projects into the at least one bore.

8. The shock protection device according to claim 7, wherein the at least one bore has a continuously constant diameter, and wherein the safety bolt has an axis and comprises a shaft with a plurality of shaft portions of different configurations, a first of the shaft portions having at least one shoulder, a second of the shaft portions being cylindrical and having a diameter, wherein the shoulder of the first shaft portion has a diameter which is smaller than a diameter of the second shaft portion, a third of the shaft portions being of eccentric configuration and located adjacent the second shaft portion, the third shaft portion having an axis radially offset relative to the axis of the safety bolt.

9. The shock protection device according to claim 8, wherein a fourth of the shaft portions is located adjacent the third shaft portion, the fourth shaft portion being cylindrical and having a diameter which is equal to the diameter of the second shaft portion.

10. The shock protection device according to claim 9, wherein the third and fourth shaft portions have a flattened surface.

11. The shaft protection device according to claim 7, wherein the at least one bore has a continuously constant diameter, and wherein the safety bolt has an axis and comprises a shaft with a plurality of shaft portions of different configurations, a first of the shaft portions having at least one shoulder, a second of the shaft portions being cylindrical and having a diameter, wherein the shoulder of the first shaft portion has a diameter which is smaller than a diameter of the second shaft portion, and wherein a third of the shaft portions adjacent the second shaft portion has one of an oval and elliptical cross section.

12. The shock protection device according to claim 11, wherein a fourth of the shaft portions is located adjacent the third shaft portion, the fourth shaft portion being cylindrical and having a diameter which is equal to the diameter of the second shaft portion.

13. The shock protection device according to claim 12, wherein the third and fourth shaft portions have a flattened surface.

14. The shock protection device according to claim 7, wherein the at least one bore has a continuously constant diameter, and wherein the safety bolt comprises a shaft with a plurality of shaft portions of different configurations, a first of the shaft portions having at least one shoulder, a second of the shaft portions being cylindrical and having a diameter, wherein the shoulder of the first shaft portion has a diameter which is smaller than a diameter of the second shaft portion, wherein the transverse pin received in the transverse bore comprises an eccentric portion located in an area of intersection with the safety bolt.

15. The shock protection device according to claim 1, wherein the material block has a top and a bottom, comprising a first safety bolt extending from the top into the material block and a second safety bolt extending from the bottom into the material block.

16. The shock protection device according to claim 1, wherein the material block has a height, and wherein the at least one safety bolt extends over the entire height of the material block.

17. A shock protection device for a force measuring apparatus, the force measuring apparatus comprising a material block having as force measuring apparatus components a stationary parallelogram side member, a deflectable parallelogram side member for receiving a force to be measured, two guide members connecting the two parallelogram side members, the guide members being bending-elastic in a parallelogram plane, and at least one lever connected through a coupling member to the deflectable parallelogram side member, the material block having at least one bore extending at least partially through the force measuring apparatus, the shock protection device comprising a safety bolt inserted into the at least one bore, the safety bolt being connected without play to one of the components forming the force measuring apparatus through which the safety bolt extends, while having a radial play relative to remaining components through which the safety bolt extends, comprising separate safety bolts extending through each lever and each guide member, wherein the separate safety bolts are connected to the stationary parallelogram side member.

18. A shock protection device for a force measuring apparatus, the force measuring apparatus comprising a material block having as force measuring apparatus components a stationary parallelogram side member, a deflectable parallelogram side member for receiving a force to be measured, two guide members connecting the two parallelogram side members, the guide members being bending-elastic in a parallelogram plane, and at least one lever connected through a coupling member to the deflectable parallelogram side member, the material block having at least one bore extending at least partially through the force measuring apparatus, the shock protection device comprising a safety bolt inserted into the at least one bore, the safety bolt being connected without play to one of the components forming the force measuring apparatus through which the safety bolt extends, while having a radial play relative to remaining components through which the safety bolt extends, comprising a safety bolt connected to at least one of the guide members and extending with play into the stationary parallelogram side member.

* * * * *